(12) United States Patent
Lindenmeier et al.

(10) Patent No.: US 7,555,277 B2
(45) Date of Patent: Jun. 30, 2009

(54) SYSTEM FOR RECEPTION OF DIGITALLY MODULATED RADIO SIGNALS TO A VEHICLE, USING ANTENNA DIVERSITY

(75) Inventors: Heinz Lindenmeier, Planegg (DE); Stefan Lindenmeier, Gauting-Buchendorf (DE)

(73) Assignee: Delphi Delco Electronics Europe GmbH, Bad Salzdetfurth (DE)

( * ) Notice: Subject to any disclaimer, the term of this patent is extended or adjusted under 35 U.S.C. 154(b) by 523 days.

(21) Appl. No.: 11/352,856

(22) Filed: Feb. 13, 2006

(65) Prior Publication Data

US 2006/0182201 A1 Aug. 17, 2006

(30) Foreign Application Priority Data

Feb. 13, 2005 (DE) .................... 10 2005 006 500
Feb. 10, 2006 (DE) .................... 10 2006 006 266

(51) Int. Cl.
*H04B 1/06* (2006.01)
*H04B 7/00* (2006.01)

(52) U.S. Cl. .................... 455/277.2; 375/347
(58) Field of Classification Search ............ 455/504, 455/506, 65, 272, 277.1, 277.2; 375/347
See application file for complete search history.

(56) References Cited

U.S. PATENT DOCUMENTS 6,633,258 B2   10/2003  Lindenmeier
6,768,457 B2   7/2004   Lindenmeier
2005/0107045 A1* 5/2005 Kroeger ................ 455/83
2006/0274820 A1* 12/2006 Walton et al. ............. 375/148

FOREIGN PATENT DOCUMENTS

EP    1 239 608    9/2002

OTHER PUBLICATIONS

"Digital Mobile Radio Systems" by K.David/T. Benkner, Verlag B.G. Teubner, Stuttgart, 1996, p. 158 under Chapter 4.2.3 Phase Shifting.

* cited by examiner

*Primary Examiner*—Nguyen Vo
(74) *Attorney, Agent, or Firm*—Collard & Roe, P.C.

(57) ABSTRACT

A reception system for motor vehicles having a diversity antenna system with a plurality of antennas and an antenna switch coupled to a receiver for the reception of digital, MPSK-modulated satellite and terrestrially broadcast radio signals containing phrase reference signals. The antenna diversity system optionally switches through at least one of two available antennas and has a signal level testing device with its input coupled to the receiver and its output coupled to the antenna switch. This is to provide an indication for the need for antenna switching to avoid signal loss by means of a signal at its output, whereby the phase reference signals occur repeatedly in a time sequence. A MPSK demodulator having a computer device and coupled to the receiver evaluates the phase reference signals so that when a phase reference signal occurs that carries the current reference phase related to the reference signal, the reference phase is updated in the receiver, thereby causing the subsequently transmitted useful symbols to be detected with the correct phase.

14 Claims, 9 Drawing Sheets

SYSTEM FOR RECEPTION OF DIGITALLY MODULATED RADIO SIGNALS TO A VEHICLE, USING ANTENNA DIVERSITY

BACKGROUND

This invention relates to a reception system having antenna diversity, for the reception of digital, MPSK-modulated satellite radio signals and/or terrestrially broadcast radio signals to a vehicle. The MPSK method (phase shift keying with M phase states) is particularly used for the radio transmission of digital signals in the frequency range above 1 GHz. Here, QPSK modulation (four phase states) is frequently selected for the downlink of a satellite radio connection, for energy reasons, because it has low sensitivity with regard to running time differences between superimposed signals, due to multipath broadcasting. These statements relate to the basic form of this modulation method, as presented, for example, in "Digitale Mobilfunksysteme" ["Digital Mobile Radio Systems"], K. David/T. Benkner, Verlag B. G. Teubner, Stuttgart, 1996, page 158, under Chapter 4.2.3 Phasenumtastung [Phase Shifting]. This also holds true, for example, for the satellite radio system SDARS, which was designed for large-area mobile radio reception in the USA. In this connection, the same signal content is broadcast for radio broadcasting by two satellites in adjacent high-frequency bands of the same HF channel bandwidth B, but offset in time. Because of the uncertainty of the transmission from the satellite to the terrestrial receiver, particularly in vehicles, terrestrial radio broadcasting takes place in metropolitan areas, in addition to the broadcast from the two satellites.

It is known that the data stream of every digital signal transmission contains signals referred to as "burst signals" or "frame data" to synchronize the transmission. These signals are established according to the appropriate standard, and are repeatedly sent at time intervals during the frame period TR. The preamble signals are generally sent within a burst, along with other signals relating to the service, so that the time duration TB of the burst signal as well as the frequency of its broadcasting therefore have the effect of reducing the transmission of useful data, because the frame frequency FR=1/TR. Furthermore, the burst signal has symbols that contain the reference phase for phase synchronization of the system. In order to ensure reliable synchronization to the symbol cycle, even at high speeds, both the frame frequency FR, and the time duration TB of the burst signal must be selected to be suitably large.

The receiver-side detection of the carrier phases contained in the transmitted useful symbols can reliably take place in the receiver if the signal/noise ratio is sufficiently great, and the system is synchronized to the symbol cycle by means of the burst signals. If this were assured at every point in time, then it would be possible to operate without redundancy. However, a fundamental problem results from the fact that the carrier phase varies greatly over the travel distance s, in a reception field, in which interference exists due to multi-path broadcasting. Thus, these variations result in an incorrect detection of the symbols, for example if the error phase deviation is less than $\pm\pi/4$ in the case of a 4PSK system. The phase progression of the reception signals is plotted as a multiple of $\pi/4$ of two antennas A1 and A2, over the travel distance s, of the vehicle, in multiples of the wavelength $\lambda$. The related level progressions of these antennas are compared to the phase progression of the received signals. The greater value of the two reception levels that occurs at the point in time in question is calculated as a heavy solid line. In the case of transmitter-side transmission of symbols having a phase that remains the same (e.g. in the phase state $\pi/4$), a high-frequency carrier would result as the reception signal when using one of the two antennas A1 and A2 are used on the vehicle, in each example, having the stochastic phase and amplitude progressions which are plotted in polar diagrams for the moving vehicle. Using a phase regulation that is available for this, according to the state of the art, for reception with only one antenna, the phase changes along the travel distance are therefore continuously regulated out. This occurs in operation, so that each of the symbols transmitted consecutively assumes one of the four intended phase states, and the deviation from this is adjusted from symbol to symbol. These phase regulation processes are susceptible to problems, and frequently lose the correct reference phase for correct detection of the symbols, particularly in the case of level loss, until another burst signal is transmitted for resynchronization. The phase progressions clearly show how the phases of the reception signals clearly differ and diverge even after only short travel distances. These phase regulation devices, which follow the reference phase for an antenna signal, have the disadvantage that when the antenna signal changes with antenna diversity switched on, and at any selected point in time, it loses the reference phase for this change, at first, and an extended resynchronization process takes place, necessarily resulting in an increased bit error rate.

The invention therefore provides a reception system having antenna diversity, which does not have the disadvantage of this phase regulation, and when the antenna signal changes, bit errors due to incorrectly detected useful symbols, are avoided.

Other objects and features of the present invention will become apparent from the following detailed description considered in connection with the accompanying drawings which disclose the embodiments of the present invention. It should be understood, however, that the drawings are designed for the purpose of illustration only and not as a definition of the limits of the invention.

BRIEF DESCRIPTION OF THE DRAWINGS

In the drawings, wherein similar reference characters denote similar elements throughout the several views.

DETAILED DESCRIPTION

Figure 1A:
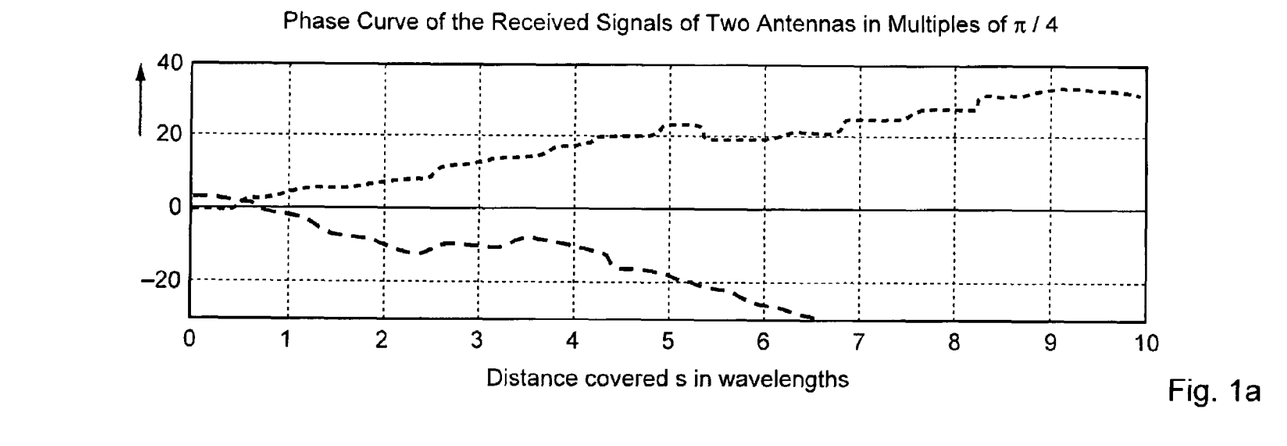
FIG. 1a shows the phase progression of the reception signals of two antennas on a vehicle in a territory having multi-path reception, over the travel distance s.
Figure 1B:
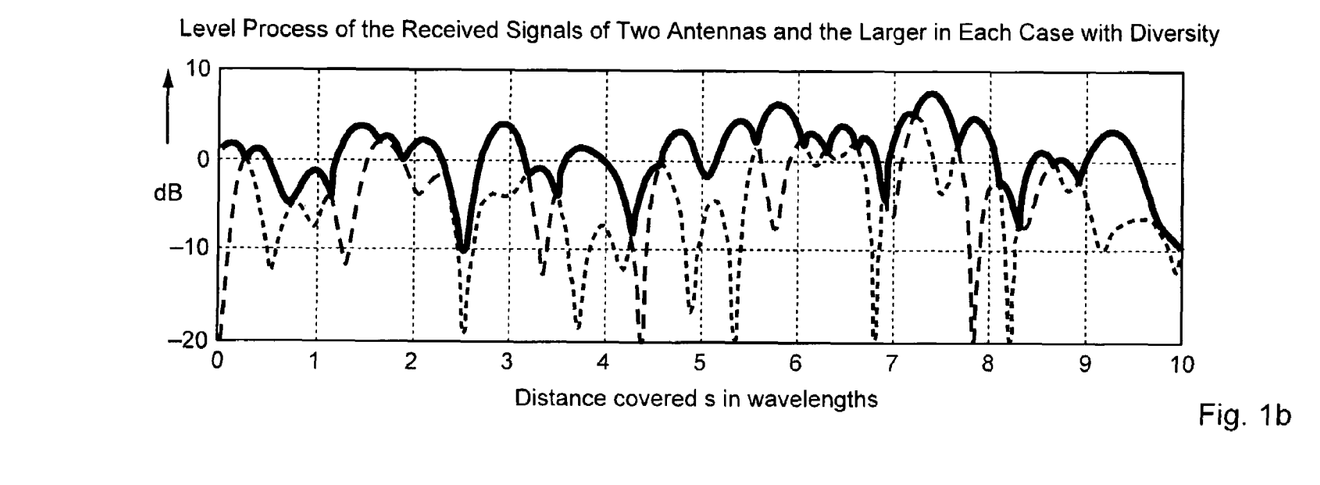
FIG. 1b shows the progression of the reception signals of antennas A1 and A2 of FIG. 1a and the progression of the greater of the two reception levels in heavy solid line.
Figure 2A:
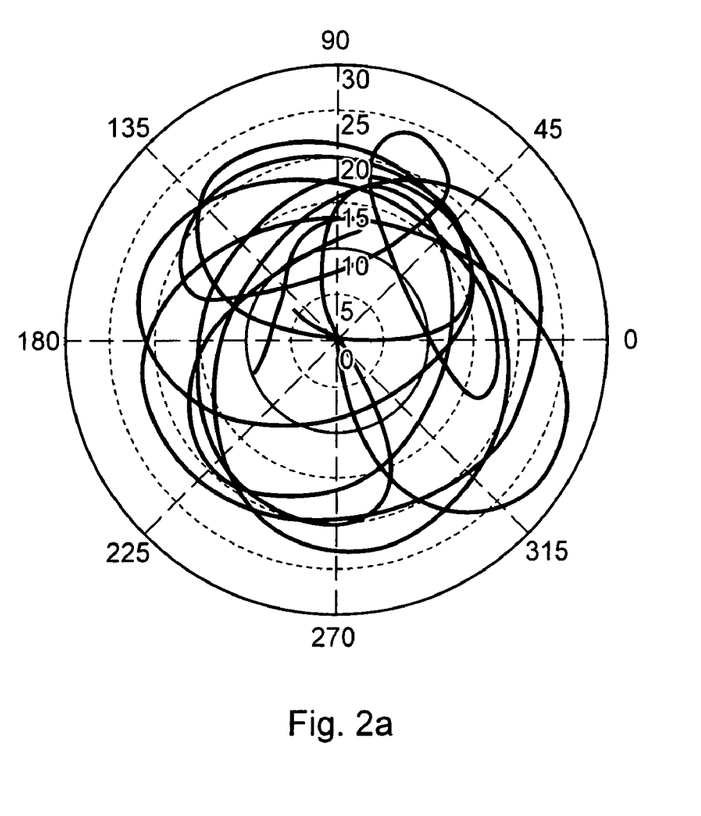
FIG. 2a shows the stochastic phase and amplitude progression of antenna A1 in a moving vehicle, with transmitter-side transmission of symbols having a phase that remains the same; e.g. in the phase state $\pi/4$.
Figure 2B:
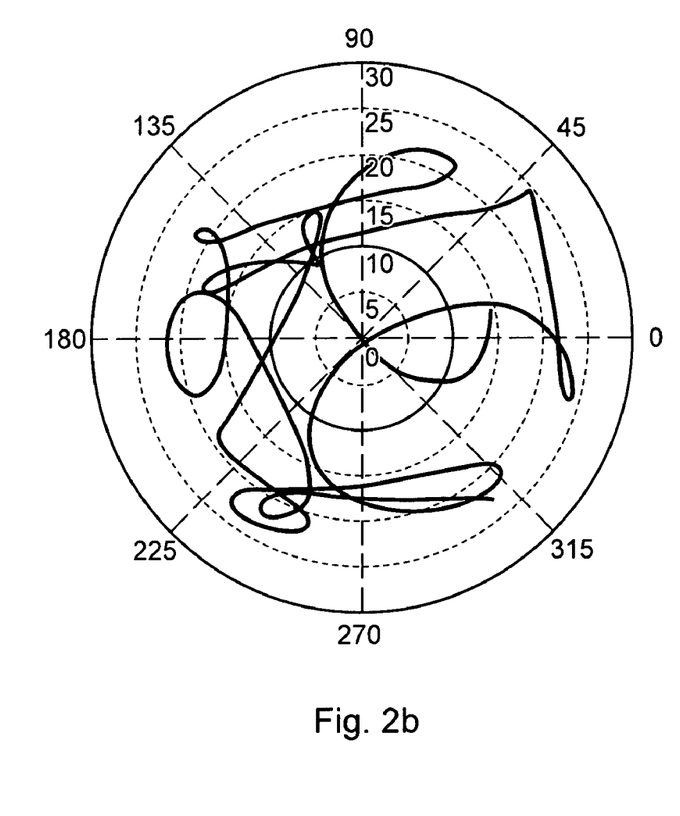
FIG. 2b shows the corresponding stochastic phase and amplitude progression of antenna A2 on the same vehicle.
Figure 3A:
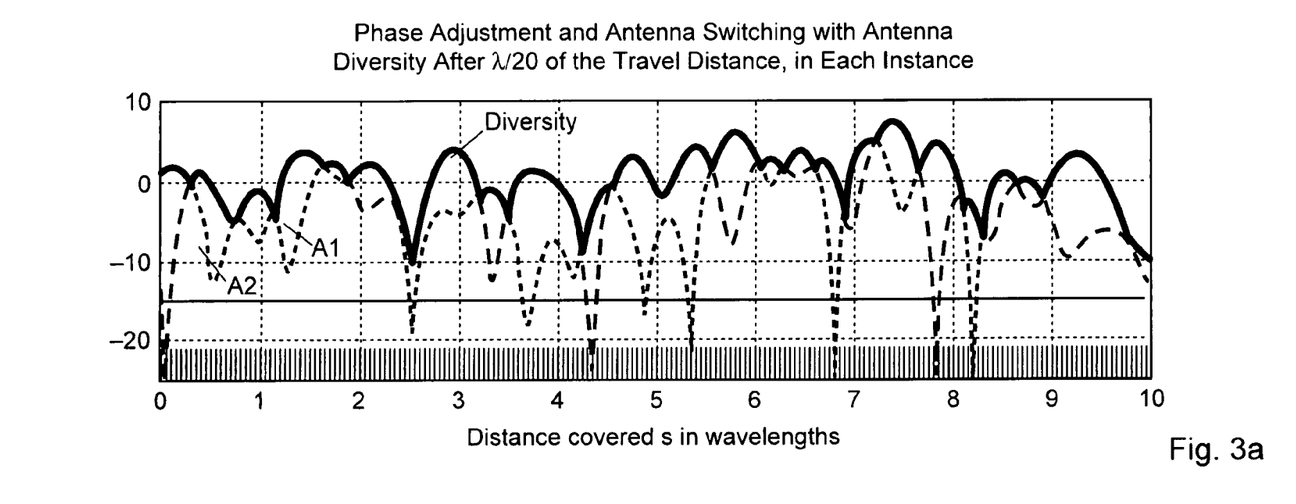
FIG. 3a shows the progression of the reception signals as in FIG. 1b, with the sequence of the phase reference signals at intervals of $\lambda/20$, indicated as lines, wherein the solid signal line shows the progression of the reception signal when there is antenna switching at intervals of $\lambda/20$, in the diversity mode.
Figure 3B:
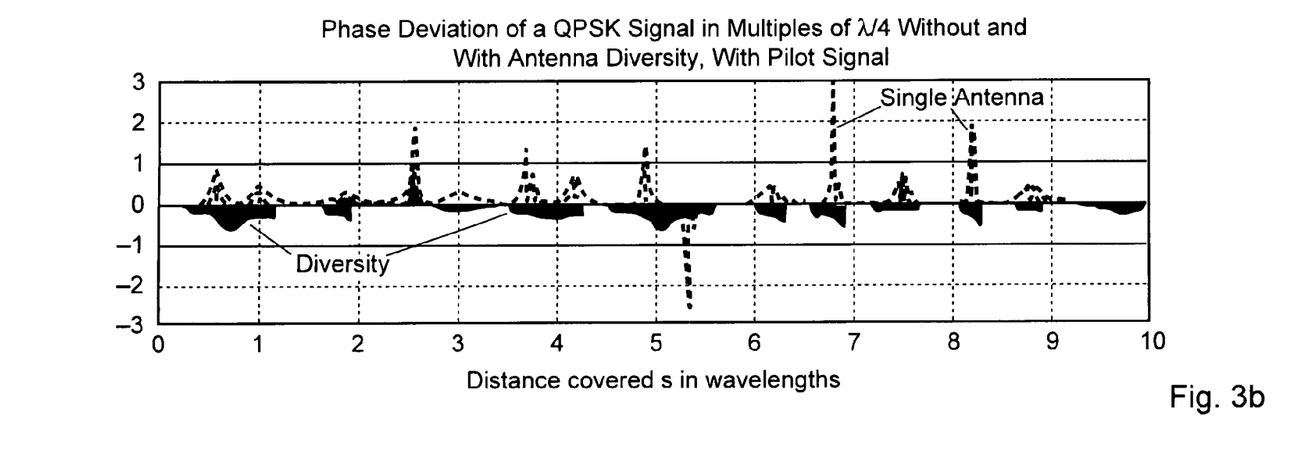
FIG. 3b shows the phase error in broken line for reception with only one antenna, and repeated updating of the reference phase in the receiver, at intervals of $\lambda/20$, in each instance, over the travel distance s, according to the invention.
Figure 4A:
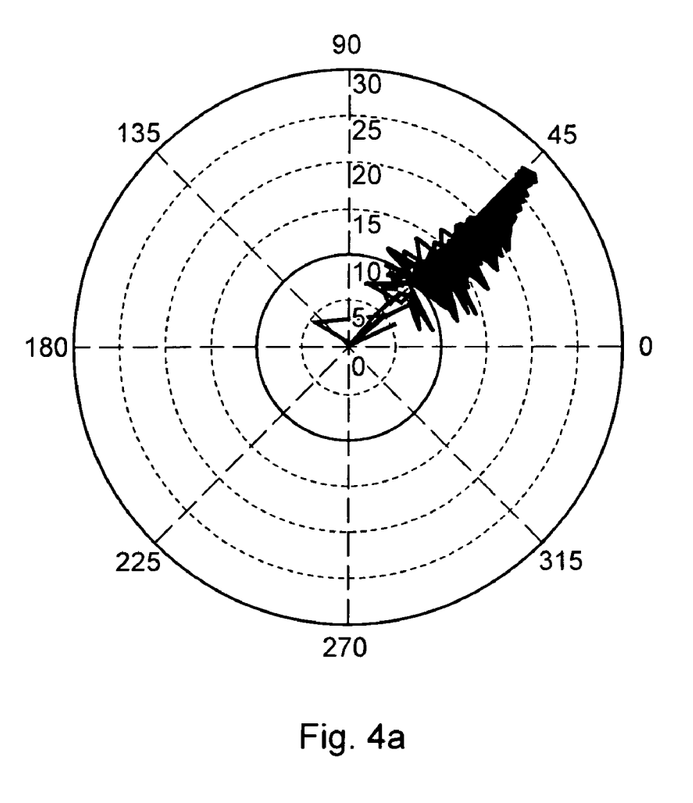
FIG. 4a shows the phase and amplitude progression of the high-frequency carrier in the case of reception with one antenna and the updating of the reference phase, according to the invention, at intervals of λ/20 when transmitting symbols that have a phase that remains the same, in the phase state π/4.
Figure 4B:
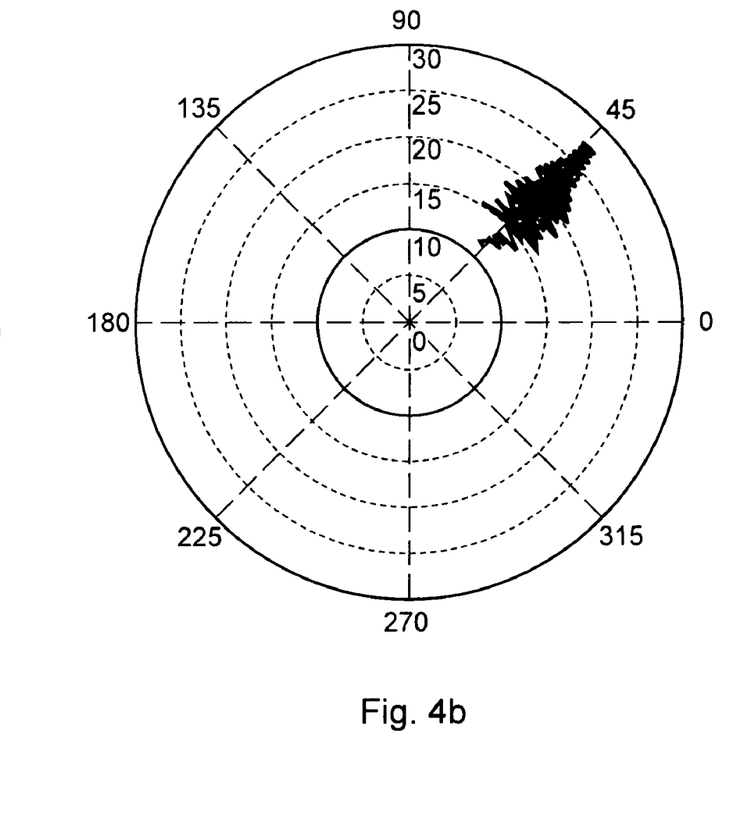
FIG. 4b shows the phase and amplitude progression of the high-frequency carrier as in FIG. 4a, but with two antennas and allowing for antenna switching at intervals of λ/20, according to the invention.
Figure 5A:
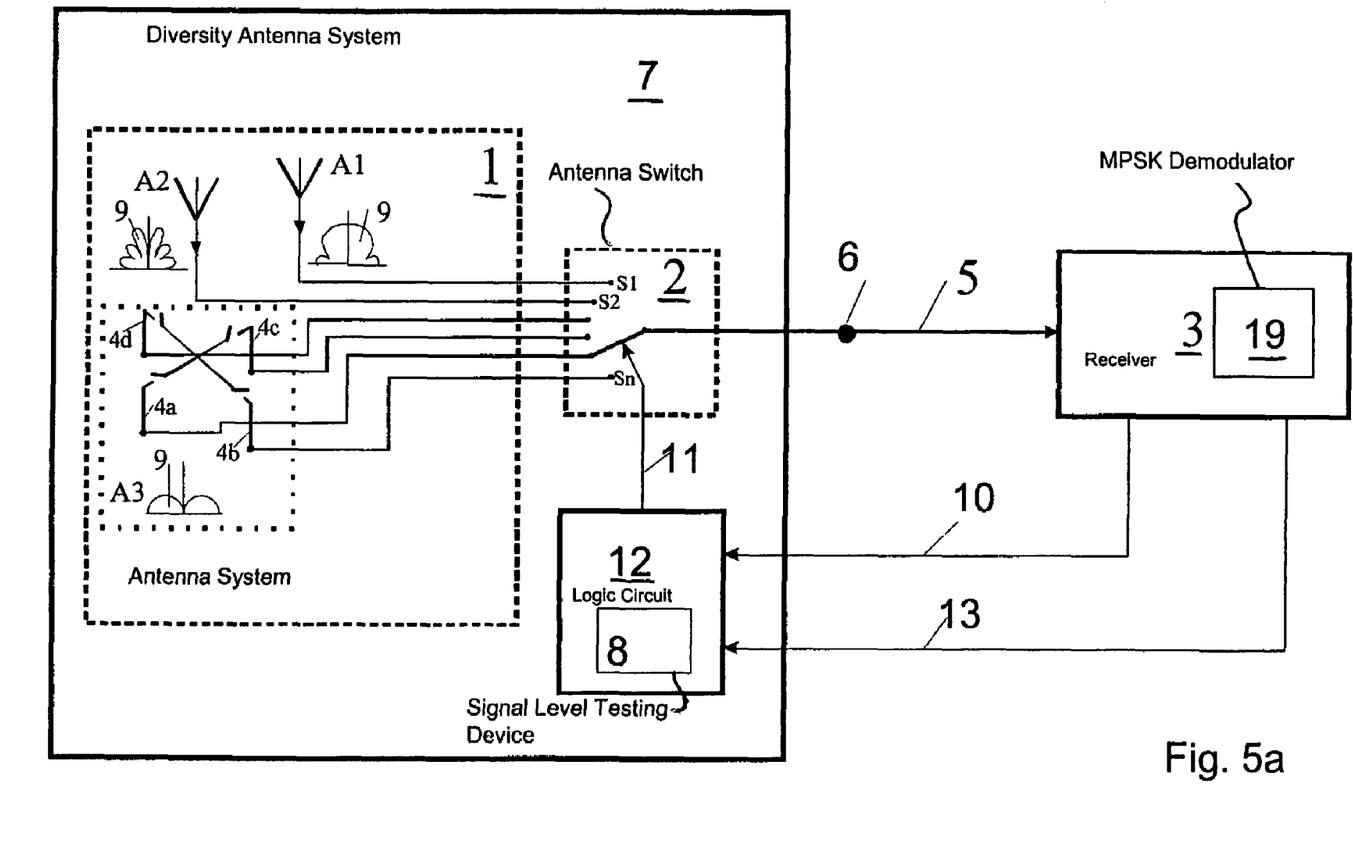
FIG. 5a is an electrical block diagram of the basic form of a reception system having a diversity antenna system 7 with multiple antennas'.
Figure 5B:
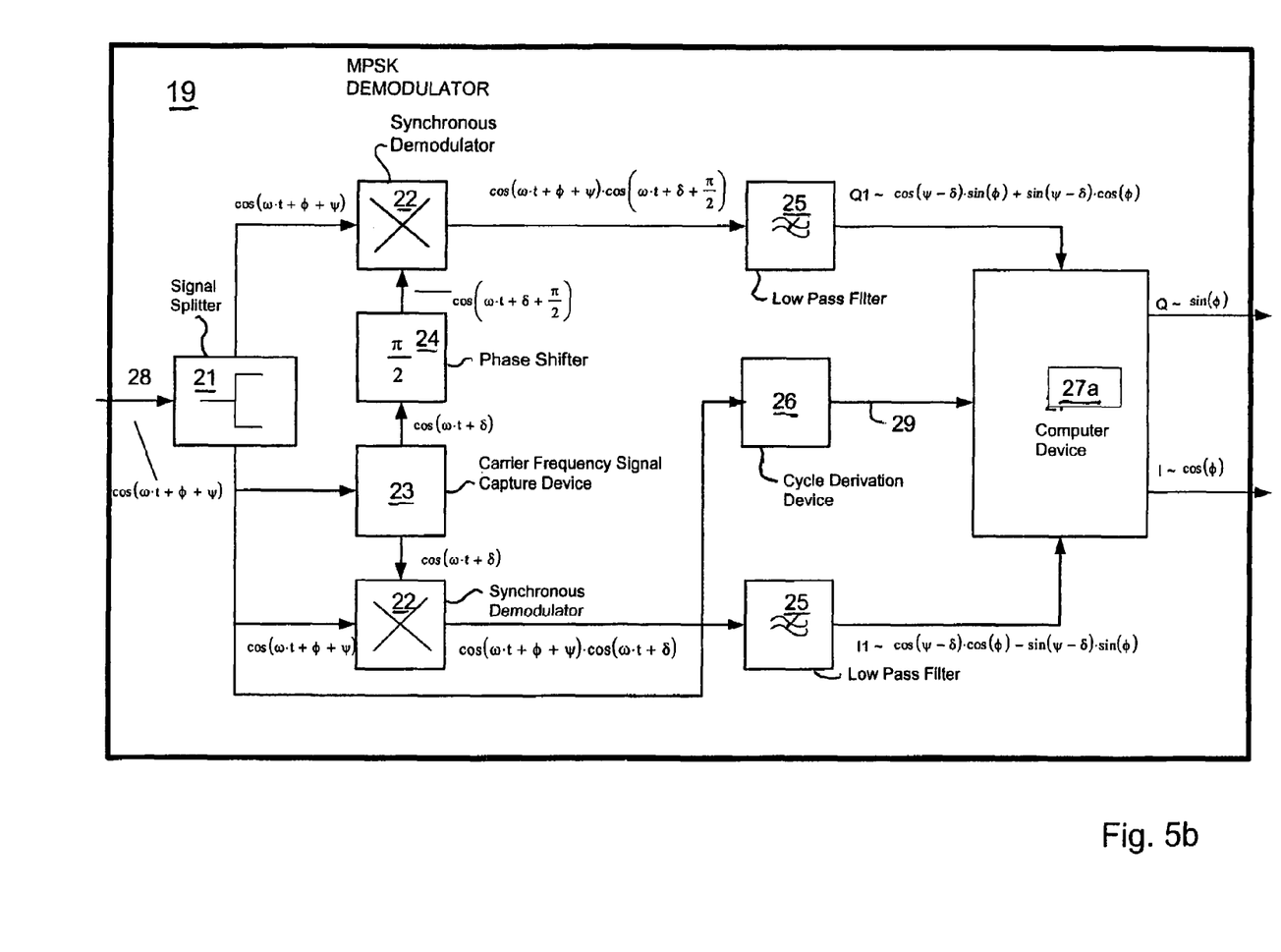
FIG. 5b shows a MPSK demodulator according to the invention, with synchronous modulators and low-pass filters, with a computer device for computer correction of the phases of the received signals.

Referring to the drawings, FIGS. 1-4a & b show the effects on the received signal as a result of the processing of the diversity circuit of FIGS. 5a and 5b. In FIG. 5a, there is shown an electrical block diagram of a reception system for receiving digitally modulated radio signals on a moving vehicle using a diversity antenna system 7. Within the diversity system is an antenna system 1 comprising antennas A1, A2, A3 (not shown), etc. having antenna parts 4a, 4b, 4c, and 4d fed into an antenna switch 2. The output 6 of antenna switch 2 containing the received signals 5 are fed into receiver 3, which includes a MPSK demodulator 19. There is also included in diversity antenna system 7, a logic circuit 12 for receiving from receiver 3 a cycle signal 10 and a reception level signal 13. Logic circuit 12 includes a signal level testing device 8 for providing an output signal 11 to antenna switch 2 in response to cycle signal 10 and reception level signal 13.

FIG. 5b shows a detailed block diagram of MPSK demodulator 19. The demodulator input signal 28 is fed into a signal splitter 21, which in turn feeds synchronous demodulators 22 and a carrier frequency capture signal circuit 23. The output of circuit 23 is also coupled to a phase shifting circuit 24, which has its output coupled to one of demodulators 22. The other output of captured device 23 also feeds the other synchronous demodulator 22. Signal splitter 21 also feeds a cycle derivation circuit 26, having its symbol cycle output 29 coupled to a computer circuit or device 27a. The outputs of both synchronous demodulators 22 are also coupled to low pass filters 25, respectively, which have their outputs coupled to computer device 27a, which is used for evaluating the phrase reference signals 15, which are discussed in detail with reference to FIGS. 6a and 6b.

It is essential to the invention that phase reference signals 15 are repeatedly transmitted at a time interval, so that at the highest driving speed, sufficiently small phase errors occur for detection, as illustrated in FIG. 3a. In FIG. 3a, the sequence of the phase reference signals 15 is indicated as lines that occur at intervals of λ/20 and the reference phase for the subsequent symbols is correctly present in the receiver. Furthermore, in FIG. 3a, the high-frequency levels are plotted in dotted and dot-dash lines. In FIG. 3b, the phase progression in the receiver assigned to the dotted level signal is shown with dots in multiples of π/4, if the updating of the reference phases takes place according to the invention, in intervals of λ/20. If the phase value of ±1 shown is exceeded, the received signal is assigned to an inapplicable quadrant, and error detection occurs. Here, the phase reference signals 15 can be formed either by burst signals 14 that are configured for the highest driving speed, at intervals of 1/20 of a wavelength, or by the pilot symbols 16, which will be discussed below.

Therefore, the time available for useful data transmission is reduced to the value (1−FR*TB). In order to structure synchronization and therefore transmission as reliably as possible, the value FR*TB will be selected to be as large as possible, so that synchronization of the reception channel having the bandwidth B with the symbol frequency 1/T~B of the individual 4PSK symbols takes place as reliably as possible. On the other hand, the channel available for transmission of the useful information is reduced by FR*TB*100%. The system experiences a further reduction in the effective channel capacity by means of the necessary redundancy of the transmission code used, the use of which is compulsory for a mobile system due to the data loss that occurs as the result of level collapses due to multi-path broadcasting and the related phase errors. The reduction in the effectively transmittable useful data, i.e. of the effective channel capacity that is accepted in order to assure reliability of transmission is therefore an important property of the digital transmission system.

Figure 6A:
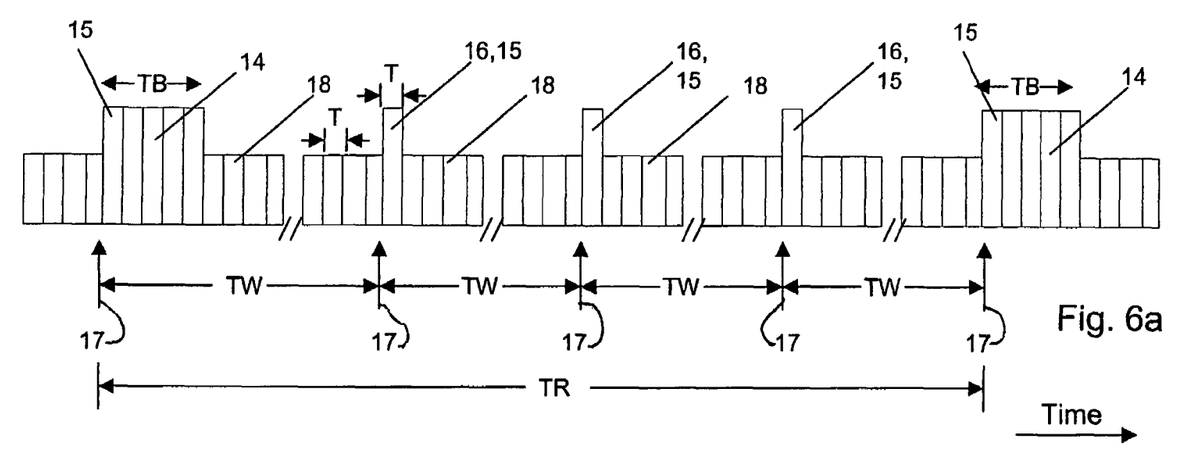
FIG. 6a shows the time progression of a particularly advantageous signal structure according to the invention.

The time progression of a particularly advantageous signal structure according to the invention is shown in FIG. 6a with pilot symbols 16 as phase reference signals 15 between consecutive burst signals 14, with phrase reference signals 15 and time points 17 for possible antenna switching at time intervals TW, in each instance.

In order to avoid the disadvantage of a large reduction in channel capacity, pilot symbols 16 that are introduced into the data stream at suitable time intervals from one another, between burst signals 14, are utilized as phase reference signals 15 in receiver 3, according to the invention. Pilot symbols 16 are transmitted at a defined pilot symbol phase angle Φp, which is used for phase-correct phase detection of the subsequent useful symbols 18, until another pilot symbol 16 or burst signal 14 is received, etc. Such a pattern over the time progression according to the invention is shown in FIG. 6a, for a particularly advantageous signal structure with pilot symbols 16, and in FIG. 6b, exclusively with burst signals 14 transmitted at suitable time intervals TW. In order to fully utilize the advantage of the invention, the time interval TW of transmitted pilot symbols 16 or of burst signals 14 in FIG. 6b (TW=TR) should be selected so that at the highest driving speed, the distance traveled is not greater than 1/20 of the wavelength λ. A significant advantage of the solution according to the invention shown in FIG. 6a is that despite burst signals 14 being transmitted at greater time intervals from one another, synchronization of the receiver system is effective and, equally, the reference phase is updated at sufficiently small time intervals, using pilot symbols 16 that are inserted in terms of time. In practical situations, a single pilot symbol 16 between consecutive burst signals 14 can generally suffice for reliable capture of the current reference phase, as the basis for correct detection of the useful symbols received subsequently, until another pilot symbol 16 or burst signal 14 follows.

Figure 6B:
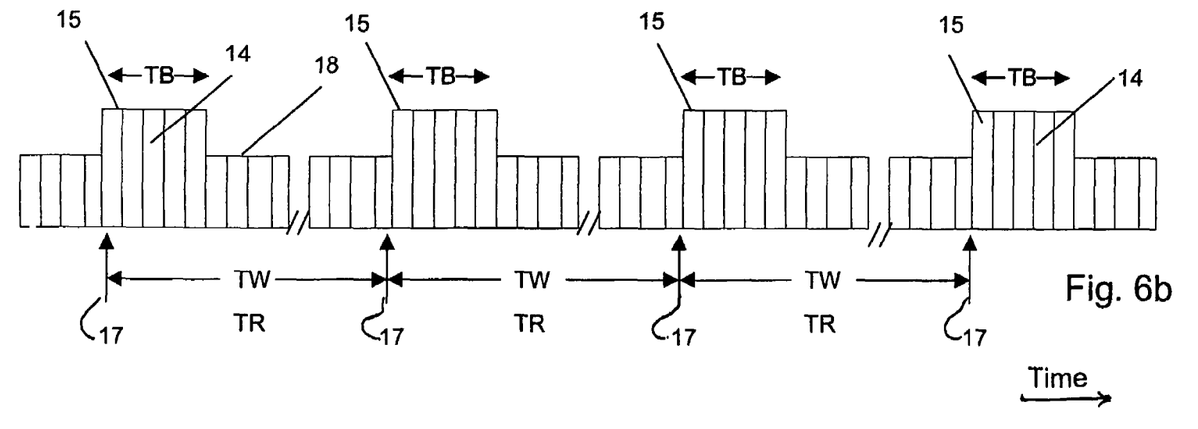
FIG. 6b shows the time progression of a particularly advantageous signal structure according to the invention, as in FIG. 6a, but exclusively with burst signals transmitted at suitable time intervals TW.

In the following, the gain in effective channel capacity that can be achieved will be explained, using an example, if pilot symbols are used and evaluated as phase reference signals inserted between burst signals 14, in terms of time. The time progression of a signal without pilot symbols 16 is shown in FIG. 6b, and is supposed to be considered as an example for high driving speeds of a maximum of approximately 100 km/h and a wavelength λ~12.8 cm, if the condition according to the invention is not met. For reliable synchronization of the receiver, burst signals 14 having a length of 30-50 symbols (TB, in terms of time) are frequently used. If one assumes realistic values of about 4000 symbols for an entire frame (TR, in terms of time), this leaves approximately 3950 useful symbols per frame. For synchronization, for example at 40 symbols, 1% of the total channel capacity is therefore used for synchronization. At a channel bandwidth of B=2 MHz and a resulting symbol duration T=1/B~1.5 µs, this results in a time duration TR of the entire frame of TR=4000*0.5 µs=2000 µs, and therefore a time interval between consecutive burst signals 14 for updating of the reference phase. The distance traveled during this time, with reference to the wavelength, is approximately 0.4λ, and is significantly too great to avoid incorrect detection of the symbols, without the adjusting regulation as stated.

When for example, seven pilot symbols 16 are used that are distributed approximately equally over the frame duration TR, as shown in FIG. 6a, the phase can be repeatedly updated at the frame duration TR=2000 µs, so that at the resulting time interval of approximately 250 µs, the reference phase at the indicated speed is present in travel distances of λ/20. In FIG. 4a an example is shown, corresponding to the representation in FIG. 2a of the phase and amplitude progression of the high-frequency carrier but using the phase reference signals 15 according to the invention in FIG. 6a, if permanent symbols having a phase that remains the same (e.g. in the phase state π/4) were transmitted, lined up with one another, and if the vehicle is moving at 100 km/h. The remaining error phase deviation is small enough, even at the highest driving speed, to avoid incorrect detection. The circle designated as 10 dB describes the limit of detectability of the symbols with regard to the required signal/noise distance. Signals that lie within the circle result in bit errors. The technically burdensome quick adjustment of the phase according to the state of the art, as mentioned above, can advantageously be eliminated, because of the small residual phase error. The reduction in channel capacity from 1% to 57/4000=1.17% is insignificant, and is more than just compensated by the significantly more reliable detection of the symbols. The transmission of a complete burst signal 14, in each instance, without pilot symbols 16, at a time interval of 250 µs, on the other hand, would result in a reduction in channel capacity of approximately 8%, which could not be tolerated.

The essential task of the invention is its effect on antenna switching for a fast-switching antenna diversity system such as that described, for example, in EP 1 239 608, and in U.S. Pat. No. 6,768,457, the text of which is incorporated herein, for the reception of digital terrestrial and/or satellite radio signals for vehicles.

In the basic form of such an antenna diversity system such as shown in FIG. 5a, antenna system 1 can consist of several individual antennas A1, A2, A3, etc., or of several antenna parts 4a, 4b, 4c, etc., whereby different sectoral directional diagrams 9 can be configured, for example (see also U.S. Pat. No. 6,633,258 the text of which is incorporated herein).

The reception signal 5 that occurs at the antenna connection point 6 is passed to a receiver 3, and the reception level 13 of antenna A1, A2, A3, etc. that is currently switched through is determined, in each instance, and passed to a logic circuit 12. Here, logic circuit 12 is designed so that the current reception level 13 is compared with the reception levels 13 of antenna A1, A2, A3, etc. that was previously switched on, using a signal level testing device 8 that is present in logic circuit 12. On the basis of this comparison, a ranking list with regard to the size of reception levels 13 of antennas A1, A2, A3, etc. is determined in logic circuit 12. If the reception level of the antenna that is switched on is less than a value necessary for reliable detection, this is a reasonable criterion for the preparation of antenna switching, brought about by generating a switching signal 11 at the output of logic circuit 12. However, antenna switching should only take place if a phase reference signal 15 follows immediately, in terms of time. Thus, antenna switching is locked out, with the exception of one time interval, in each instance, immediately before every updating of the reference phase, which interval has the shortest possible time length. It should, however, occupy maximally ⅕ of the length of the time interval TW between consecutive updates, in terms of time, of the reference phase. As a criterion for the determination of the need for antenna switching, going below a level that is necessary for reliable detection of the received signals exists, and antenna switching to a different antenna (preferably to the antenna at the top of the ranking list) takes place during the time interval immediately ahead of the subsequent updating of the reference phase.

The comparison with the signal levels of the other antennas takes place in a "level testing procedure" by means of the extremely fast switching of antenna switch 2 over a very short level testing time (which is less than the symbol time T), with subsequent extremely fast switching back to the antenna signal that was originally switched on. The comparison determination of the reception levels 13 of antennas A1, A2, A3, etc. therefore takes place, according to the invention, by means of brief switching of the antenna switch 2 from the antenna currently switched on, to the antenna to be compared with regard to its reception level, in each instance, and by means of the shortest possible determination, in terms of time, of a reception level sample for preparation for possible antenna switching, during the time period that is locked out for antenna switching. By means of extremely fast switching and fast switching back to the antenna originally switched on, during transmission of the useful data, the reception levels are impaired as little as possible by the level testing procedure.

Because the antenna signal originally switched on remains in place after the level testing time, the reference phase for the signals subsequently detected is not disrupted by the level testing procedure. These level testing procedures can be carried out at sufficiently small intervals, without any disruptive influence on reception, so that the levels of the signals are present in sufficiently updated form in a memory contained in logic circuit 12. If one chooses to go below a certain predetermined reception level as a criterion for the need for antenna switching, for example, logic circuit 12 can indicate this need by means of a switching signal 11. If the greatest signal is supposed to be selected as the criterion, for example, then logic circuit 12 can indicate the need for antenna switching by means of switching signal 11, using comparative level testing procedures. According to the invention, however, antenna switching can only be carried out during the occurrence of a phase reference signal 15, so that the reference phase is available for the antenna signal after antenna switching, for detection of the subsequent symbols. In a preferred embodiment of the invention, antenna switching is therefore brought about by logic circuit 12 in the last, or one of the last useful signals before the occurrence of a phase reference signal 15. Because of the running time difference of the different antenna signals on the vehicle, which difference is small enough to be ignored with regard to cycle times, the cycle signals in all of the antennas on the vehicle can be viewed as being technically identical. However, the slight running time differences result in problems with regard to the high-frequency carrier phases that are supposed to be prevented with the system of the invention.

In a particularly advantageous embodiment of a diversity reception system according to the invention, antenna switching, which should preferably take place synchronously with the symbol cycle, is now carried out most advantageously at the end, in terms of time, of the last useful signal that occurs before the pilot symbol 16 or burst signal 14, and the new reference phase is detected and maintained in the receiver, together with pilot symbol 16 that follows immediately, so that all the subsequent signals until the next pilot symbol are correctly detected on the basis of this reference phase. The phase jump that exists with switching over from one antenna to another antenna is therefore taken into account by means of a simultaneous new orientation of the reference phase that applies for the other antenna. In this way, bit errors that would be caused by the antenna switching can be completely avoided, unless both antennas undergo a level collapse at the same time.

The advantageous use of an antenna diversity system according to the invention, with selection according to the greatest signal level, is illustrated by means of the level progression in FIG. 3a, shown with a solid line, which describes the greater level of the two antennas, in each instance, as well as the related phase progression in FIG. 3b, also shown with a black line. The solid straight line in FIG. 3a represents the downward level limit with regard to detectability, at about −10 dB. It is evident that the diversity system is at risk exclusively in the case of a simultaneously occurring level collapse of both antenna signals (mark 2500), both with regard to incorrect phase detection and also incorrect amplitude detection as the result of noise. For this reason, it is recommended that several antenna signals be made available for antenna diversity.

FIG. 4b corresponds to the representation in FIG. 4a of the phase and amplitude progression of the high-frequency carrier when the present invention is used with antenna diversity, if permanent symbols having a phase that remains the same (e.g. in the phase state π/4) are transmitted and lined up with one another, and the vehicle is traveling at 100 km/h. In this case, neither amplitude errors nor phase errors occur, and all of the signals are detected correctly.

Figure 7:
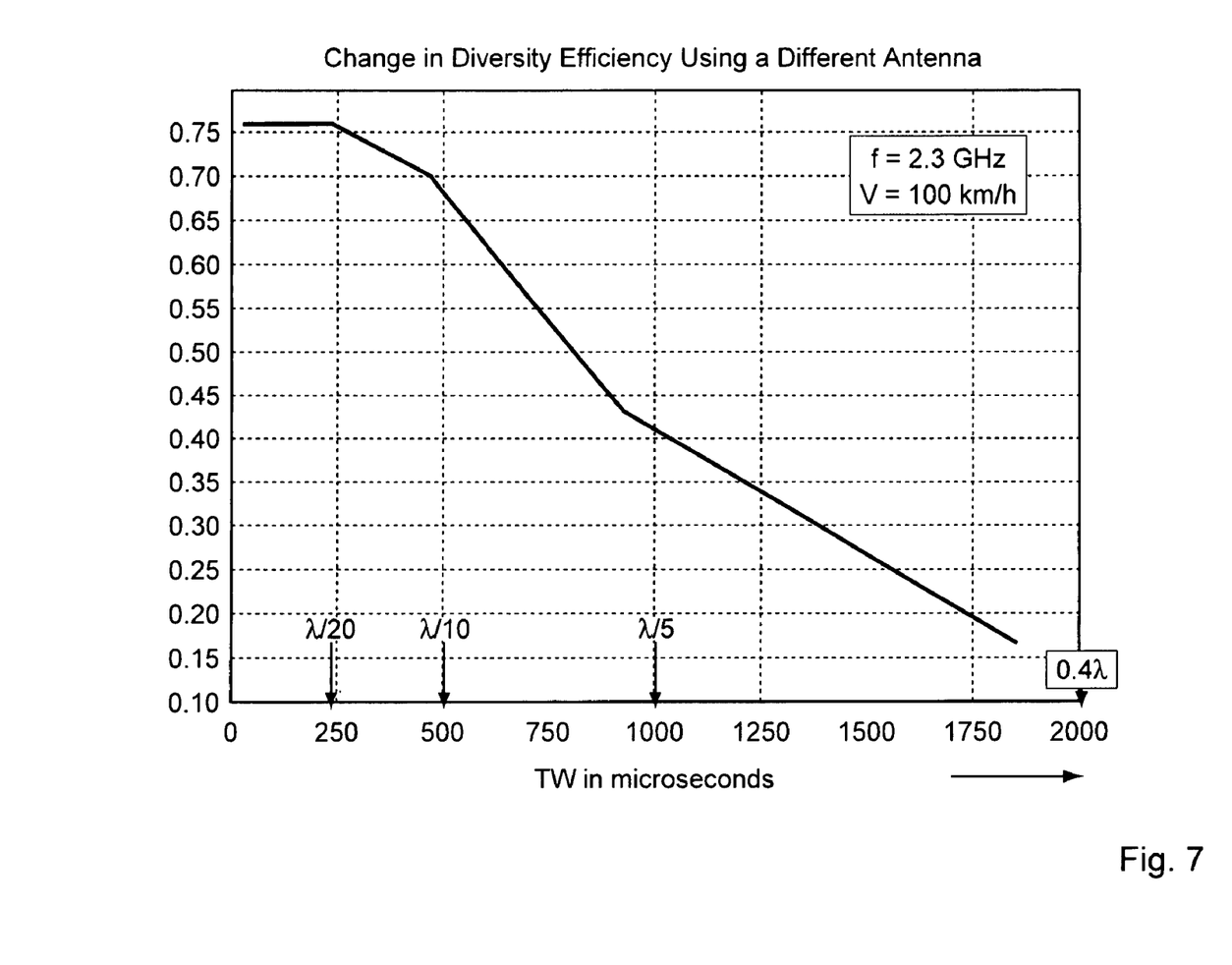
FIG. 7 shows the decrease in diversity efficiency over the time interval TW/ms between repeated possible antenna switching, if TW is selected to be greater than the traveled distance of λ/20; and, FIG. 8 is a phase diagram of the phase of a pilot symbol broadcast on the transmitter side as a phase reference signal, under the known phase angle Φp, with the true values of the in-phase component I and the quadrature component Q.

The diversity efficiency is a measure of the effectiveness of antenna diversity, and cannot exceed the number of physically available antenna signals in the case of switched antenna diversity. In FIG. 7, the decrease in diversity efficiency is plotted over the interval TW/μs, and the figures show an example of the decrease at a maximum speed, if TW is selected to be greater than a traveled distance of λ/20.

Figure 8:
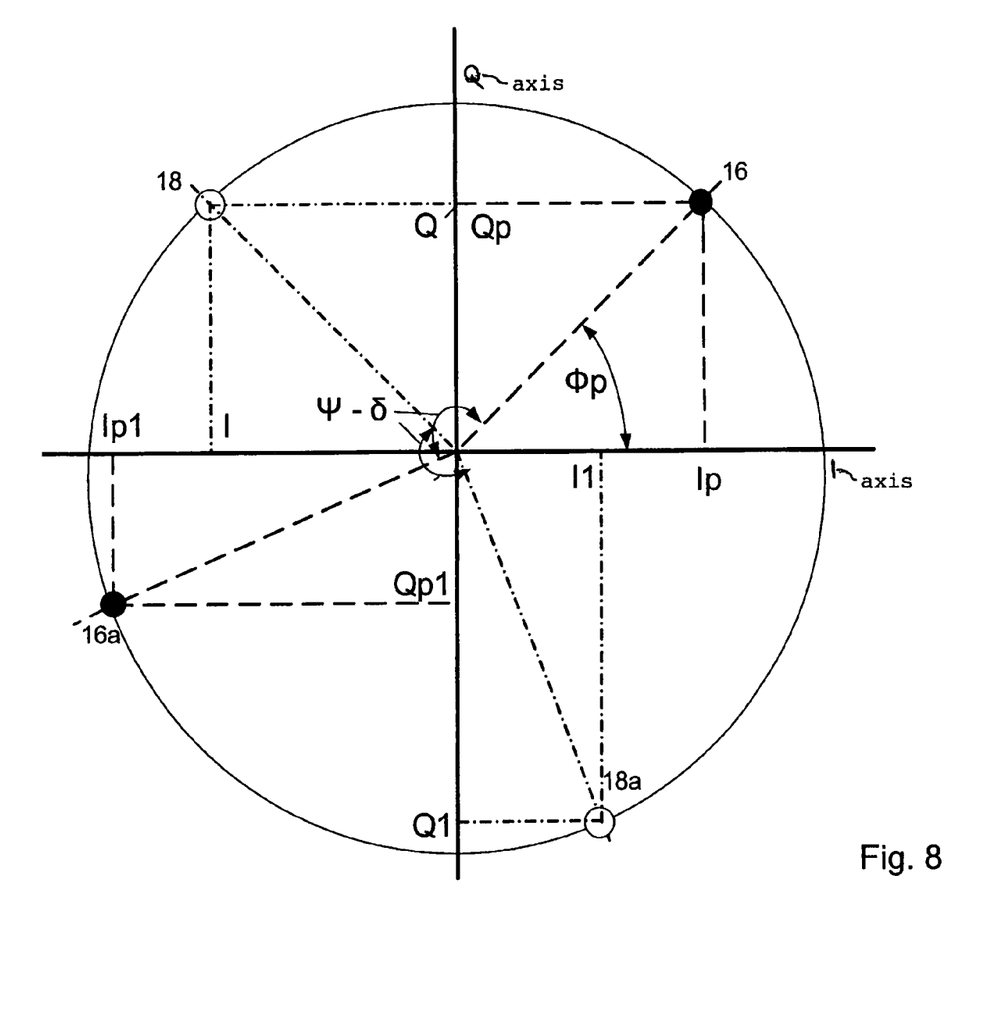

Using FIGS. 5b and 8 as an example, it can be shown how updating of the reference phase can take place for preparation of antenna switching, in an advantageous embodiment of the invention. FIG. 5b shows the structure of an MPSK demodulator 19 according to the invention, whose demodulator input signal 28, which generally represents the reception signal in the intermediate frequency plane, is passed to a signal splitter or branching device 21 and passed on to one of two synchronous modulators 22 as well as a device for carrier frequency signal capture 23, and to a device for cycle derivation 26, in each instance. The output signal of the carrier frequency capture device 23 is superimposed on the original phase in one of the two synchronous modulators 22, and on the input signal in the other (rotated by the angle π/2, using the π/2 phase shift element 24). The output signals of the synchronous modulators 22 are passed to the computer device 27a, after filtering in a low-pass filter 25, in each instance, and are converted in this device, controlled by the symbol cycle 29 at the output of the cycle derivation device 26. In other words, the received values of the in-phase component Ip1 and I1, respectively, and of the quadrature component Qp1 and Q1, respectively, are converted to the true values, in each instance, of the in-phase component I and Ip respectively, and the quadrature component Qp and Q, respectively, which are therefore present at the output of the MSPK demodulator 19. The simple equation required for this, for conversion of the received components I1 and Q1, results from the following derivation as an example for QSPK signals.

With $\omega$ representing the circuit frequency of the carrier oscillation, $\Phi$ as the true phase angle of a transmitted symbol, and $\psi$ as an unknown phase shift, which the signal experiences on the transmission path, the oscillations for the input signal 28 are expressed as;

$$\cos(\omega \cdot \tau + \Phi + \psi)$$

After the signal is superimposed in the synchronous modulators 22, as described, with the carrier oscillation whose phase $\delta$ is also undefined at the output of the carrier frequency signal capture device 23, an oscillation of the following form occurs at the output for the in-phase component $$\cos(\omega \cdot \tau + \Phi + \psi) \cdot \cos(\omega \cdot \tau + \delta)$$

and, for the quadrature component, the oscillation is $$\cos(\omega \cdot \tau + \Phi + \psi) \cdot \cos(\omega \cdot \tau + \delta + \pi/2)$$

After the signals are filtered in low-pass filters 25, the following signal remains for the quadrature component Q1

$$\cos(\psi - \delta) \cdot \sin(\Phi) + \sin(\psi - \delta) \cdot \cos(\Phi)$$

and for the in-phase component I1

$$\cos(\psi - \delta) \cdot \cos(\Phi) - \sin(\psi - \delta) \cdot \sin(\Phi)$$

If the angle difference $\psi - \delta$ is known, the received components I1 and Q1 can be converted to the true values I and Q. Upon reception of a pilot symbol 16, transmitted as a phase reference signal 15, and having the known pilot symbol phase angle $\Phi p$, the angle difference $(\psi - \delta)$ can be indicated from the following functions, from the related pilot symbol 16a having the components Ip1 and Qp1.

$$\cos(\psi - \delta) = (Qp1 \cdot \sin(\Phi p) + \cos(\Phi p) \cdot Ip1$$

and $$\sin(\psi - \delta) = (\cos(\Phi p) \cdot Qp1 - Ip1 \cdot \sin(\Phi p))$$

This angle shift is also experienced by all the signals that are transmitted as useful symbols 18, and occur in the receiver as useful symbols 18a shifted by this angle difference, as shown in FIG. 8. There, a pilot symbol 16 having the known pilot symbol phase angle $\Phi p = \pi/4$ and its true components I and Q and the related received pilot symbol 16a are plotted in an angle diagram. Likewise, a useful symbol 18 and the related received useful symbol 18a, shifted by the same angle $\psi - \delta$, are plotted.

The functions stated above for the angle difference $(\psi - \delta)$ can be calculated in the fast-working computer device 27a of FIG. 5b, using the received components Ip1 and Qp1, and the known pilot symbol phase angle $\Phi p$. For all of the received useful symbols 18 that follow a phase reference signal 15, the angle difference can be considered as constant, according to the invention, within a sufficiently small time interval TW. Within each time interval TW, the true components I and Q can therefore be calculated from the received components I1 and Q1 of the useful symbols 18, in the computer device 27a, in real time, and picked up at its output.

From the above equations, the quadrature phase component can be indicated as follows $$Q=\sin(\Phi p)\cdot(Q1\cdot Qp1+I1\cdot Ip1)-\cos(\Phi p)\cdot(Q1\cdot Ip1-I1\cdot Qp1)$$

And the in-phase component is:

$$1=\cos(\Phi p)\cdot(Q1\cdot Qp1+I1\cdot Ip1)+\sin(\Phi p)\cdot(Qp1\cdot I1-Q1\cdot Ip1)$$

This simple transformation, which requires little time, can be carried out in real time by a computer according to the state of the art.

In both components, a constant is also contained, in each instance, which is the same in the case of symmetry of the two branches, and is not necessary when determining the phase angle $\Phi$ of the useful symbols 18, because it holds true that:

$$\cdot\tan(\Phi)=Q/1$$

In an advantageous embodiment of the invention, the frequency of updating of the reference phase can be adapted to the driving speed, so that the time interval of updating of the reference phase TW is structured variably if corresponding phase reference signals 15 are available. In this connection, the distance traveled during the time TW should not be greater than preferably $\lambda/20$, but in no case greater than $\lambda/5$.

Accordingly, while several embodiments of the present invention have been shown and described, it is to be understood that many changes and modifications may be made thereunto without departing from the spirit and scope of the invention as defined in the appended claims.

What is claimed is:

1. A reception system comprising:
   a diversity antenna system having a plurality of antennas and an antenna switch;
   a receiver coupled to the switch of said diversity antenna system for the reception of digital, MPSK-modulated satellite radio signals and/or terrestrially broadcast radio signals containing phrase reference signals, and/or terrestrial broadcast radio signals having a wavelength $\lambda$ to a vehicle, wherein said antenna diversity system serves as a switching diversity circuit for switching through at least one of two available antennas,
   a signal level testing device having its input coupled to said receiver and its output coupled to said antenna switch of said diversity antenna system, said signal level testing device providing an indication for the need for antenna switching to avoid signal loss by means of a signal at its output whereby phase reference signals, present in the transmitted MPSK signal, repeatedly occur in a time sequence;
   a MPSK demodulator having a computer device and coupled to said receiver for evaluating the phase reference signals that are present, so that when a phase reference signal occurs that carries the current reference phase related to the reception signal, said reference phase is updated in the receiver, thereby causing the subsequently transmitted useful symbols to be detected with the correct phase;
   wherein the time interval between updates of the reference phase that follow one another in terms of time is so small that the vehicle distance traveled is not greater than $\lambda/5$;
   wherein the antenna switching that is required because of the predetermined criteria is locked out, with the exception of one time interval, in each instance, immediately before every update of the reference phase; and,
   wherein each reference phase update occurs with the smallest possible time length, but maximally ⅕ of the length of the time interval between updates of the reference phase.

2. The reception system according to claim 1, wherein said receiver is designed to receive QPSK radio signals.

3. The reception system according to claim 1, comprising a logic circuit coupled in the diversity antenna system, to which both a symbol cycle and a frame cycle as well as a cycle of the phase reference signals are passed, and wherein said logic circuit indicates the need for antenna switching according to a predetermined criterion, by means of providing a switching signal to said antenna switch, and if said switching signal occurs, antenna switching is locked out, at first, by means of said logic circuit, and is carried out only in response to cycle signals present in said logic circuit, coordinated before the occurrence of said phase reference signal, so that the reference phase is available for the switched antenna signal, after antenna switching, for detection of the subsequent symbols.

4. The reception system according to claim 3, wherein said logic circuit is designed so that antenna switching is performed by said logic circuit in the last, or one of the last symbols before the occurrence of a phase reference signal.

5. The reception system according to claim 4, wherein the reception level of said antenna that is currently switched through is determined, and the current reception level is compared with the reception levels of said antenna that was previously switched on, and a ranking list with regard to the size of the reception level is determined and, if the need for antenna switching is determined, the switching takes place in the time interval immediately before the next update of the reference phase.

6. The reception system according to claim 5, wherein in said receiver, said reception level of said antenna that is currently switched through is determined and passed to said logic circuit, and said logic circuit is designed so that the current reception level is compared with the reception levels of said antenna that was previously switched on, using said signal level testing device that is present in said logic circuit, and a ranking list with regard to the size of its/their reception levels is determined and, if the need for antenna switching is determined, the switching takes place in the time interval immediately before the next update of the reference phase.

7. The reception system according to claim 5, wherein the criterion for determining the need for antenna switching is set at a level that is below a level necessary for reliable detection of the received signals.

8. The reception system according to claim 5, wherein the comparing determination of the reception levels of said antennas takes place by means of short-term switching of said antenna switching switch from the antenna currently switched on to the antenna to be compared in terms of its reception level, in each instance, and by means of the shortest possible determination, in terms of time, of a reception level sample, to prepare for possible antenna switching, during the time period that is locked out for antenna switching.

9. The reception system according to claim 8 wherein said MPSK demodulator circuit comprises;
   a signal branching device disposed at the input of the MPSK demodulator, for splitting an input signal and passing it to one of two synchronous modulators, in each instance, as well as to a. device for carrier frequency signal capture and a device for cycle derivation, and the output signal of A carrier frequency signal capture device is passed to one of said two synchronous modulators in the original phase and to the other shifted by the angle π/2, and the output signals of said synchronous modulators are passed to said computer device after filtering in a low-pass filter, in each instance, and that in said computer device, controlled by a symbol cycle, conversion of the received values of the in-phase component Ip1 or I1, respectively, and of the quadrature component Qp1 or Q1, respectively to the true values of the in-phase component I or Ip, respectively, and of the quadrature component Qp or Q, respectively, takes place, and these values are present at the output of said MPSK demodulator.

10. The reception system according to claim 1, wherein said phase reference signals are derived from the burst signals, so that the time interval of said burst signals corresponds to the time interval of the phase reference signals.

11. The reception system according to claim 1, wherein when phase reference signals are sent in the form of a corresponding number of pilot symbols, which are inserted into the data stream between consecutive burst signals, in terms of time, by means of division of the frame duration, updating of the reference phase in the receiver takes place using said burst signals and said pilot symbols, in each instance, and the time interval between updates of the reference phase that follow one another in time is sufficiently small because of a sufficient number of pilot symbols.

12. The reception system according to claim 1, wherein said computer device for evaluation of the phase reference signals (15), which impart a known reference phase Φp, is designed so that the received phase reference signal, with its shift by a phase angle ψ, which is unknown due to the transmission path, and a carrier frequency oscillation derived from the received signal, with a shift by the phase angle δ, which is also unknown, as well as a signal of this carrier frequency oscillation that is shifted in phase by the angle of π/2, are superimposed on the received phase reference signals, in each instance, so that an in-phase component Ip1 and a quadrature component Qp1 are present, and said computer device determines a set of true values of the in-phase component Ip and the quadrature component Qp, on the basis of the two determined components Ip1 and Qp1 and on the basis of the known reference phase Φp, and therefore a current angle difference ψ-δ between the reference phase Φp and the angle that corresponds to the in-phase component Ip1 and the quadrature component Op1 is determined by calculations, and analogous to this, the true values of the in-phase component I and the quadrature component Q are calculated from the determined in-phase component I1 and the quadrature component Q1, using the current angle difference ψ-δ, for all of the data signals that follow said phase reference signal in terms of time.

13. The reception system according to claim 12, wherein the true values of the in-phase component I and the quadrature component Q can be determined by calculations, in an analogous manner, from the in-phase component I1 and the quadrature component Q1 that are present at the output of the superimposition, in each instance, for all the MPSK reception signals that follow said phase reference signal in terms of time, using the angle difference ψ-δ that is currently determined.

14. The reception system according to claim 1, wherein the time for updating the reference signal is so small that the distance traveled in the time interval of updating the reference phase (TW) is not greater than λ/20.

* * * * *